United States Patent [19]

Houf, Jr.

[11] 4,049,169
[45] Sept. 20, 1977

[54] CRESCENT SILENCING RESET MECHANISM FOR FAST FORWARD 8-TRACK CARTRIDGE

[75] Inventor: Robert Henry Houf, Jr., Wheaton, Ill.

[73] Assignee: Motorola, Inc., Schaumburg, Ill.

[21] Appl. No.: 661,227

[22] Filed: Feb. 25, 1976

[51] Int. Cl.² .......................................... B65H 17/22
[52] U.S. Cl. ................................. 226/47; 226/178; 192/12 BA; 325/310
[58] Field of Search ............... 226/46, 47, 174, 178, 226/188; 242/55.19 A; 192/12 BA, 26, 81 R; 325/310

[56] References Cited

U.S. PATENT DOCUMENTS

| | | | |
|---|---|---|---|
| 3,233,806 | 2/1966 | Shirai | 226/178 |
| 3,850,357 | 11/1974 | Lace | 226/178 |

*Primary Examiner*—Robert W. Saifer
*Attorney, Agent, or Firm*—James W. Gillman; James P. Hamley; Donald J. Lisa

[57] ABSTRACT

A fast forward drive for a cartridge tape player comprises upper and lower crescents which increase the effective capstan diameter in the fast forward mode. At normal playing speed the crescents index with respect to a received tape cartridge such that the capstan's surface forcibly engages the cartridge's pressure roller.

When the fast forward mode is desired a clutch couples the upper crescent to the capstan for rotation therewith. Rotational drive of the upper crescent is coupled to the lower crescent, at a predetermined phasing relationship, through a pin and trough arrangement, whereby fast forward is effected. On return to the normal play speed the upper crescent is fixedly indexed, resulting in a decreased lower crescent rotational drive and thus an increased chance of improper lower crescent alignment. To promote lower crescent indexing a second spring clutch is mounted on the capstan between the lower crescent and the housing which actively drives the lower crescent to its indexed position. In this manner a positive force operates on the lower crescent for proper indexing.

The improvement provides a bistable pivot member which selectively engages the lower spring clutch in the normal speed mode, thereby declutching the lower crescent, and totally disengages the spring clutch in the fast forward mode thereby providing a silent fast forward mode of operation.

10 Claims, 4 Drawing Figures

CRESCENT SILENCING RESET MECHANISM FOR FAST FORWARD 8-TRACK CARTRIDGE

BACKGROUND OF THE INVENTION

This invention pertains to continuous loop tape cartridges and, more particularly, to improvements in fast forward drives for the same. Continuous loop tape cartridge player systems are well known in the art. Basically, the cartridge is comprised of a hub, a platen, a pressure roller, and guiding means to guide a continuous loop of tape. The tape is wound about the hub and guided past a front access and around the pressure roller. The taper player is provided with a vertically standing capstan which is rotatably driven off a motor actuated flywheel. The capstan is located such that on cartridge insertion into the player the capstan forcibly engages the pressure roller thus rotatably driving the roller. The tape, being pinched between the pressure roller and capstan, is thereby driven.

Until recently, the popularity of cartridge tape players was retarded due to a serious limitation. Namely, the player could only drive the tape at a single speed. Thus, for example, if it were desired to hear a track that had just been played, the user would have to wait until the tape played through at its normal playing speed. To overcome this problem some manufacturers provided a means whereby the player motor speed was increased. This proved unsatisfactory, however, since motor life was significantly degraded. An excellent solution to the problem is offered by Melvin Lace in his U.S. application Ser. No. 563,947, filed Mar. 31, 1975, and assigned to the same assignee as the instant invention. Lace teaches a means whereby the effective diameter of the capstan is increased in the fast forward mode. A pair of predeterminedly developed crescents ride on the capstan, and allow capstan-pressure roller interface in the normal play mode. On activation to fast forward, the upper crescent clutches to the capstan for rotation therewith. The upper crescent rotates 180° out of phase with the lower crescent at which time rotational drive from the upper crescent is coupled to the lower crescent via a pin and trough arrangement. The crescent outer surfaces interface with the pressure roller effecting fast forward.

It has been found, however, that the above mentioned fast forward mechanism is subject to an occasional problem. When the player returns from the fast forward to the normal play speed, the upper crescent indexes and declutches at a point at which the lower crescent is still in contact with the pressure roller. Since the lower crescent had been primarily driven by the upper crescent, it loses a significant rotational force which would tend to index it back in the normal play mode. Occasionally, especially with rubber pressure rollers, the remaining rotational forces on the lower crescent are not sufficient to index it properly, resulting in an undesirable player "hang up."

An improvement in the Lace crescent fast forward system is that disclosed in U.S. patent application Ser. No. 591,674, filed June 30, 1975 to Edwin S. Bara and assigned to the same assignee as the instant invention. There a lower crescent spring was provided to positively drive the lower crescent to index in the proper position on return to the normal play mode. A problem with the Bara drive system is that the means for clutching or declutching the lower crescent spring included a spring tail located in the path of the lower clutch spring which constantly impinges the same. This arrangement produces an annoying clicking sound when the player is operating in the fast forward mode.

OBJECT OF THE INVENTION

It is an object of this invention, therefore, to provide a silenced reset mechanism for a fast forward 8-track cartridge.

Briefly, according to the invention, a fast forward cartridge tape player is comprised of a housing provided with a cartridge receiving cavity. A cylindrical capstan is rotatably driven about its longitudinal axis by a motor actuated flywheel. The longitudinal axis of the capstan is in a vertical plane and the capstan is predeterminedly positioned to engage the pressure roller of a received cartridge.

The player further comprises a plurality of crescents rotatable about the capstan. Each crescent has an inner face, an outer face and a vertical dimension. The inner face is formed to encircle greater than 180° of the capstan circumference while revealing a substantial arc on the capstan surface. A means is operable to select either the fast forward or normal speed modes. In the normal speed mode the upper crescent decouples from the capstan, and is indexed in a position such that it reveals the capstan to the pressure roller of a received cartridge. On activation to the fast forward mode, a means couples the upper crescent to the capstan for rotation therewith. A coupling and aligning means sequentially couples rotational drive from one crescent to the crescent beneath it at predetermined crescent phasings whereby the crescents outer faces form a substantially circular configuration as viewed from a point above the axis of the capstan, thereby effecting fast forward. A second means which couples rotational drive of the capstan to the lowermost crescent is provided which actively drives the lower crescent to index at a position such that it exposes the capstan to the pressure roller when the player is activated from the fast forward to the normal speed mode. The second means also comprises a means for disengaging the lowermost crescent on tape player activation to the fast forward mode, thus providing a silenced fast forward mode of operation, and forcibly engaging the lowermost crescent on tape player activation to the second mode, thereby providing the declutching function.

DETAILED DESCRIPTION OF THE PREFERRED EMBODIMENT OF THE INVENTION

Figure 1:
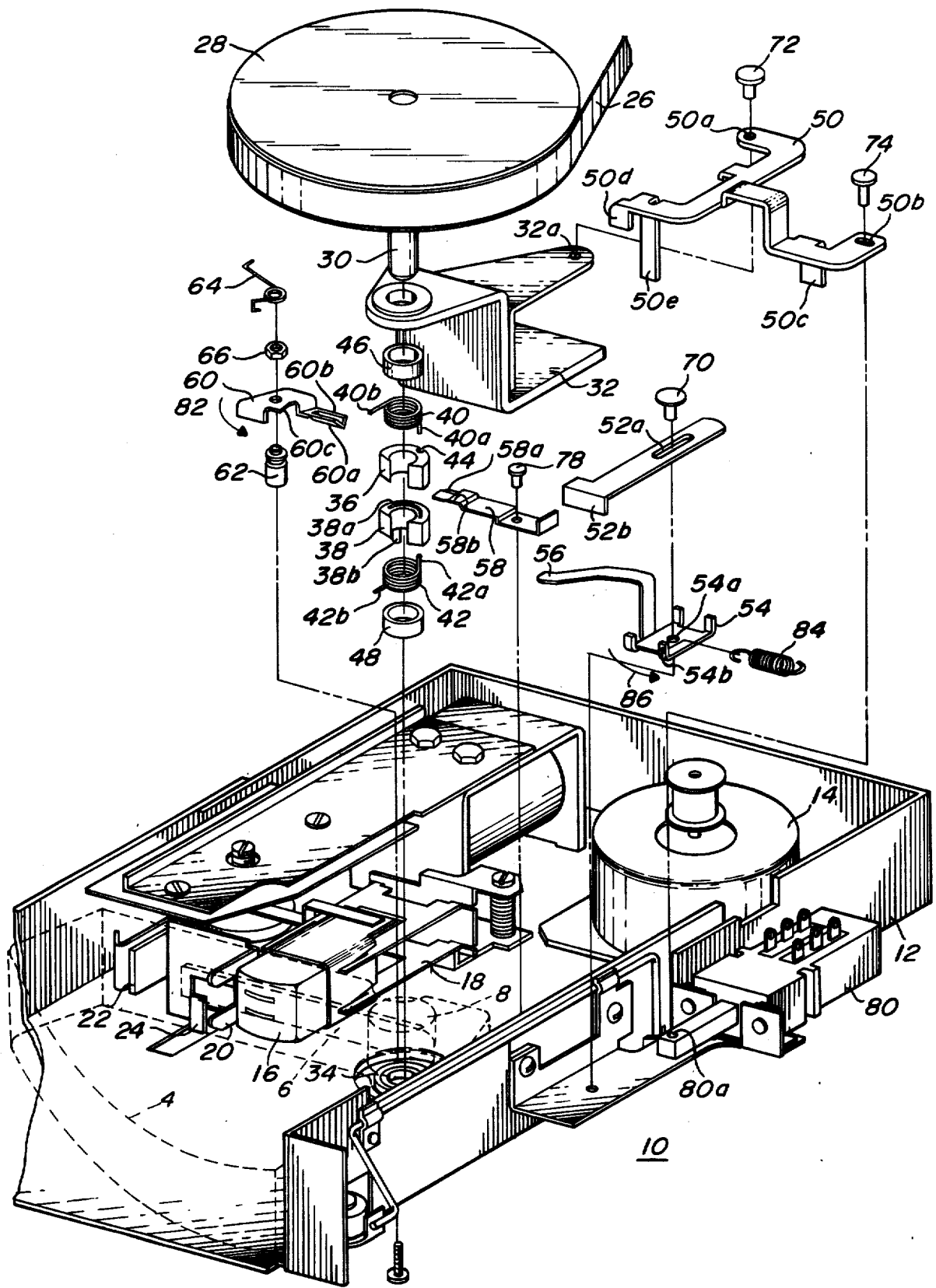
FIG. 1 illustrates an exploded view of a two crescent fast forward tape player mechanism.

Referring to FIG. 1, an improved tape player 10 is shown having a chassis 12 with a motor 14, tape head 16, tape head indexing mechanism 18, tape guide 20, end of tape sensor 22, and tape insert detent mechanism 24 affixed thereto. The motor 14 drives a belt 26 which in turn rotatably drives a flywheel 28 and a capstan 30 about its longitudinal axis. The capstan 30 mounts through a bracket 32 and to a chassis bearing 34 whereby it is positioned in a vertical plane adapted to forcibly engage a tape 6 and pressure roller 8 of a tape cartridge 4 to be played, shown in dotted lines.

Upper and lower crescents 36, 38 are stacked on, and rotatable about, the capstan 30. Each crescent has an inner face, an outer face and a vertical dimension such that the inner face encircles greater than 180° for the capstan circumference while revealing a substantial arc on the capstan surface. Thus each crescent is vertically supported on the capstan, while providing a substantial surface for engagement by the capstan directly to an inserted tape cartridge. Upper and lower clutch springs 40, 42 are also located about the capstan 30. One arm 40a of the upper clutch spring locates in a provided slot 44 in the upper crescent whereas the first arm 42a of the lower clutch spring 42 locates in a corresponding slot (not shown) in the lower crescent. Thus, via the spring arms 40a and 42a the springs are constrained to rotate with the crescents 36, 38 respectively. The remaining free ends 40b, 42b align with the declutching means discussed more fully hereinbelow.

Upper and lower bearings 46, 48 support the crescents 36, 38 and clutch springs 40, 42 between the bracket 32 and the chassis bearing support 34.

The improved interlock mechanism is comprised of an actuating arm 50, a pivot interlock slide 52 and an interlock 54 which is integrally provided with a cartridge sensing arm 56, a spring thrust member 58, a pivot lever 60, pivot post 62, a bias spring 64 and a retaining nut 66.

In construction, a pin or rivet 70 inserts through a provided slot 52a in the slide 52 and through a provided hole 54a in the interlock 54 to the tape player chassis 12. Additional pins 72, 74 insert through provided holes 50a, 50b in the actuating arm 50 and are received in a provided hole 32a in the bracket 32, and a provided hole 80a in a motor speed control switch 80, respectively. Actuating arm 50 is located such that its first engaging face 50c may be forcibly engaged by depression of the pivot 52, and its second engaging face 50d may be engaged by the upper spring clutch arm 40b. The lower portion of the engaging member 50e on actuating arm 50 is aligned to ride over the spring thrust member 58 which is affixed to the chassis 12 via a pin 78. In turn, a V-shaped notch 58a in the end of the spring thrust member 58 is aligned underneath a corresponding V-shaped notch 60a, b in the pivot lever 60, which pivots about a pivot post 62 also affixed to the chassis 12. A spring 64 and retainer 66 bias the pivot lever 60 in a direction indicated generally by arrow 82. Finally, a bias spring 84 connects between the chassis 12 and a provided hole 54b in the interlock 54 whereby the interlock 54, cartridge sensing arm 56, and slide 52 are generally biased in a direction indicated by arrow 86.

Operation of the interlock silencing mechanism is understood as follows. In the normal speed mode the pivot 52 does not engage engaging face 50c of actuating arm 50, and therefore, engaging face 50d of actuating arm 50 forcibly engages end 40b of the upper spring clutch 40. This causes a declutching operation of the spring 40, whereby the upper crescent 36 is free to slip relative to the capstan 30 such that the capstan directly drives an inserted tape cartridge. Also, extended member 50e of actuating arm 50 rides on the upper step 58b of the spring thrust member 58 whereby the thrust member notch portion 58a is out of engagement with the notch portion 60a of the pivot lever 60. Thus, the bias of spring 64 causes the pivot lever 60 to pivot in a direction indicated by arrow 82 thus forcibly engaging lower spring clutch end 42b thereby declutching the lower crescent 38.

On activation to the fast forward mode, the front engaging face 52b of pivot 52 is forcibly engaged thereby driving pivot 52 back against engaging face 50c of actuating arm 50. This causes actuating arm 50 to rotate about pin 72 thereby simultaneously rotating extended member 50e off of raised step 58b of thrust member 58 and locating engaging face 50d of arm 50 out of engagement with upper spring clutch end 40b. Thus, spring clutch 40 couples capstan rotational drive to the upper crescent 36 thus causing the upper crescent 36 to rotate with the capstan 30. A pin (not shown) extending downwardly from the lower surface of crescent 36 rides in a trough 38a provided in the upper surface of lower crescent 38. After a given angle of upper crescent 36 rotation such that the crescents are aligned in a vertical configuration as viewed at a point above the capstan, the pin strikes the end wall of the trough 38a whereby the upper crescent drives the lower crescent for rotation therewith. This drive causes a downwardly extending pin 38b from crescent 38 to strike a provided cam 60c on pivot lever 60 thus tending to rotate pivot lever 60 in a direction opposite that of arrow 82. Since extended member 50e of actuating arm 50 no longer rides on the raised step 58b of spring thrust member 58, the notch 58a provided in thrust member 58 engages the front surface 60a of the notch provided in the pivot lever 60. Due to the force of the pin 38b engaging the cam 60c the pivot lever 60 is rotated to its second stable state whereat the notch 58a engages the backside 60b of the notch provided in the pivot lever 60. In this state, the pivot lever 60 is located totally out of engagement with spring end 42b of lower spring clutch 42 such that the interlock system operates in the fast forward mode without any sounds from impinging members.

Upon activation back to the normal speed mode, the pivot 52 is released whereby the actuating arm swings back to its rest position. Thus, engaging face 50d engages the upper spring clutch end 40b thereby declutching and aligning the upper crescent 36. Also, the extended member 50e of actuating arm 50 relocates over the raised portion 58b of thrust spring 58 thereby releasing the pivot lever from its second stable position and allowing the spring 64 to return the pivot lever to its rest state. Thus, once the free end 42b of lower spring clutch 42 engages the pivot lever 60, the lower spring clutch 42 declutches and the lower crescent 38 is indexed in its proper normal play position.

To further enhance the fast forward speed, a speed control switch 80 is provided which, when depressed, increases the motor RPM. The speed control switch 80 is coupled to the pivot interlock slide via pin 74 whereby when the system is activated to the fast forward mode both crescent and increased motor speed drive provide the fast forward function.

Figure 2:
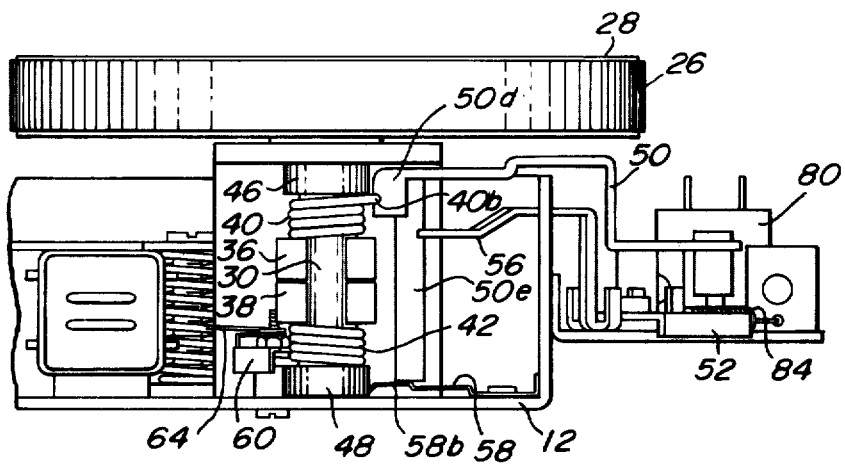
FIG. 2 illustrates a front view of the two crescent system when operating in the normal speed mode.

Operation of the tape player in the normal speed mode is better understood with reference to FIG. 2. There may be seen the belt 26 coupled to the flywheel 28 which in turn drives the capstan 30. Located about the capstan are upper and lower bearings 46, 48, upper and lower spring clutches 40, 42, and upper and lower crescents 36, 38. The pivot interlock slide 52 is not depressed, and, therefore, the actuating arm 50 is in position to engage and declutch the upper clutch spring 40. Also, the extended member 50e is riding on the raised surface 58b of the spring thrust member 58 whereby the pivot lever 60 is biased by spring 64 into engagement with the lower clutch spring, thereby declutching it and the lower crescent 38.

Figure 3:
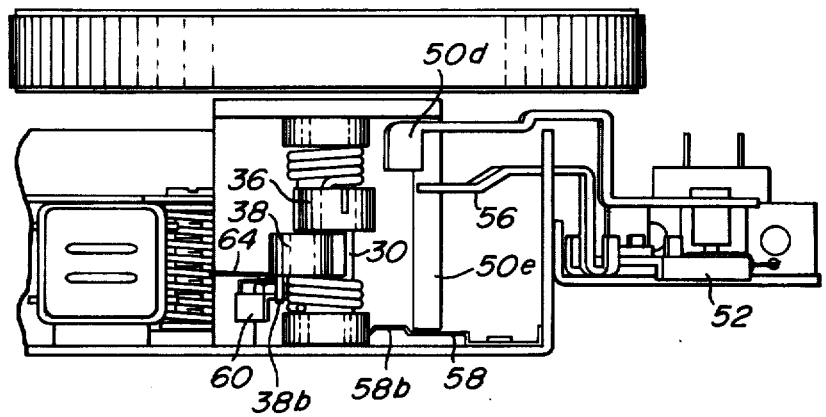
FIG. 3 illustrates a front view of the two crescent fast forward mechanism when operated in the fast forward mode.

Activation of the tape player in the fast forward mode is understood with reference to FIG. 3. There, the pivot interlock slide is forcibly engaged, as, for example, by a manual selector switch located on the player, whereby the slide 52 forcibly engages the actuating arm 50. This causes the actuating arm engaging surface 50d to rotate out of engagement with the upper clutch spring 40 whereby the spring and upper crescent 36 rotate with the capstan 30. As described with reference to FIG. 1, at this point the upper crescent will rotate with the capstan until a pin extending downwardly from the upper crescent 36 engages the end wall of a trough provided in the upper surface of the lower crescent 38. At that point the upper crescent will drive the lower crescent into rotation. Since extended member 50e of actuating arm 50 has been rotated off of the raised surface 58b of the spring thrust member 58, the notches provided on the thrust member and the pivot lever are such that the force of the pin 38b extending from the lower crescent 38 impinging on the cam surface 60c of the pivot lever 60 is sufficient to drive the pivot lever 60 into its second stable position. In this position, lever 60 is totally out of the path of the lower crescent 38 and pin 38b whereby the resulting fast forward operation is substantially silent.

The spring 64 is of proper construction such that the total effective drive from the upper crescent to the lower crescent is sufficient to overcome the spring tension thus allowing pivot lever 60 to be biased to its second stable state whereas the tension from spring 64 is sufficient to cause pivot lever 60 to forcibly engage and declutch the lower spring clutch 42 when the only drive provided to the lower crescent is that from its own spring clutch.

Figure 4:
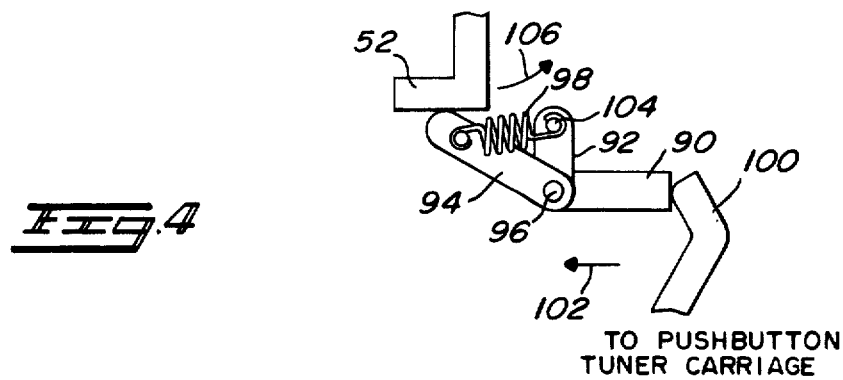
FIG. 4 illustrates a linkage suitable for selecting either the normal or fast forward tape player modes via an associated radio pushbutton tuner assembly.

FIG. 4 illustrates a linkage suitable for coupling a pushbutton of an associated pushbutton tuner to act as a selector for the tape player. This is a particularly useful feature in automotive radio/player combinations wherein available face plate space is at a premium. As is well known in the art, pushbutton radios generally provide a means, upon pushbutton depression to declutch the manual tuning knob of the radio. This is commonly accomplished by causing a carriage to translate in a direction proper to declutch the tuning knob. In FIG. 4 a rod 100 is shown as connected to the pushbutton tuner carriage. Rod 100 is arranged in contacting arrangement with connecting arms 90, 92, 94. The arms are connected at a common pivot 96, and the entire assembly rotates about pivot 104 of rod 92. An overcenter spring 98 is provided between rods 94 and 92. On depression of the pushbutton the rod 100 is translated in a direction indicated by arrow 102 thus causing arms 90, 92 and 94 to rotate about pivot 104. This causes the free end of arm 94 to forcibly engage the pivot interlock slide 52 thereby activating the tape player to the fast forward mode. Override spring 98 allows connecting rod 94 to slide along the interlock slide 52 due to excessive travel of the rod 100.

The spring 84 and cartridge engaging arm 56 as shown in FIG. 1-3 provides a convenient means for preventing actuation of the tape player to the fast forward mode when no cartridge is inserted within the player. Without a cartridge in the player, spring 84 biases the interlock 54 and pivot 52 in a direction indicated generally by arrow 106 whereat it is not engageable by arm 94. Thus, activation of the pushbutton merely rotates arm assembly 90, 92, 94 without engaging the fast forward actuation slide. However, once a cartridge is inserted within the player, the cartridge engaging arm 56 thereby rotates pivot interlock slide 52 in a position to be engaged by the linkage assembly.

In summary, an improved interlock silencing mechanism has been provided which allows fast forward operation of a tape player in substantially a silent mode.

While a preferred embodiment of the invention has been described, it should be apparent that many modifications and variations thereto are possible, all of which fall within the true spirit and scope of the invention.

I claim:

1. An interlock mechanism for a cartridge tape player comprising;
   a cylindrical capstan rotatably driven about its longitudinal axis by a motor actuated flywheel, the longitudinal axis being located in a vertical plane and predeterminedly positioned to forcibly engage the tape and pressure roller of a tape cartridge to be played;
   a plurality of crescents vertically stacked on, and rotatable about, the capstan, each crescent having an inner face, an outer face and a vertical dimension, the inner face encircling greater than 180° of the capstan circumference while revealing a substantial arc on the capstan surface, the outer face of predetermined curvature, the vertical height predeterminedly fixed;
   first means coupling the uppermost crescent to the capstan for rotation therewith in a first mode;
   means coupling each crescent to the crescent beneath it in the first mode, including means aligning the crescents such that the outer faces form a substantially circular configuration as viewed from a point above the axis of the capstan;
   means decoupling the uppermost crescent from the capstan in a second mode and indexing the uppermost crescent such that it reveals the capstan to the pressure roller; and
   second means coupling rotational drive of the capstan to the lowermost crescent actively driving it to index at a position such that it exposes the capstan to the pressure roller when the player is activated from the first to the second mode, the second means comprising means for disengaging the lowermost crescent upon activation to the first mode and forcibly engaging the lowermost crescent on activation to the second mode.

2. The mechanism of claim 1 wherein the second means further comprises means clutching the lowermost crescent to the capstan when the player is in the first mode, and declutching and disengaging the crescent from the capstan in the second mode.

3. The mechanism of claim 2 wherein the second means comprises a stop member and a spring, the spring having first and second ends and a plurality of turns of given diameter, the turns located about the capstan, the first end forcibly engaging the lowermost crescent, and the second end operably engaging the stop member, the stop member comprising a pivotal lever, mounted to the tape player and operable in first and second positions, adapted for forcibly engaging the second end of the second means spring in the first position and pivoting out of engagement with the second end of the second means spring in the second position, the mechanism further comprising actuating means for setting the pivotal lever in its first position responsive to the player operating in its second mode and setting the pivotal lever in its second position responsive to the player operating in its first mode, whereby under the action of friction between the capstan and inner face of said crescent the spring diameter increases to slide on the capstan when the second end is held by the stop member, the spring diameter otherwise decreasing to clutch the capstan and rotate therewith.

4. The mechanism of claim 3 wherein the pivotal arm is biased to its first position by a spring member.

5. The mechanism of claim 4 wherein the spring member is of predetermined construction for preventing the second end from rotating as a result of the frictional force between the capstan and the lowermost crescent's inner face, and for having a suitable compliance whereby the force coupled to the second end during player operation in the first mode overcomes the holding force of the stop member, thereby releasing the second end.

6. The mechanism of claim 3 wherein the actuation mechanism includes means for establishing the pivotal lever second position as a stable position and activating the pivotal lever to the second position during operation of the tape player in its first mode.

7. The mechanism of claim 6 further comprising a manually operable mode selector for selecting player operation in either the first or second mode, the actuation means including linkage means coupled to the selector and responsive thereto for setting the position of the pivotal lever.

8. The mechanism of claim 6 wherein the actuation means comprises an impinging arm, affixed to the lowermost crescent, for impinging the pivotal lever and driving the same to its second position when the tape player is operated in its first mode.

9. The mechanism of claim 7 in combination with a speed controllable motor, coupled to the mode selector, for increasing the capstan rate of rotation responsive to the selector mode selecting player operation in the first mode.

10. The mechanism of claim 6 further comprising linkage means adapted to couple the mechanism to a pushbutton controlled radio such that a pushbutton of said radio is operable as the mode selector.

* * * * *